(12) United States Patent
Stephenson et al.

(10) Patent No.: US 10,904,377 B2
(45) Date of Patent: *Jan. 26, 2021

(54) PASSENGER OPERATION NETWORK CONCURRENT WITH VEHICLE OPERATION

(71) Applicant: International Business Machines Corporation, Armonk, NY (US)

(72) Inventors: Martin Stephenson, Ballynacargy (IE); Pierpaolo Tommasi, Dublin (IE); Elizabeth Daly, Dublin (IE); Giovanni Russo, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,031

(22) Filed: Nov. 6, 2019

(65) Prior Publication Data
US 2020/0076943 A1 Mar. 5, 2020

Related U.S. Application Data

(63) Continuation of application No. 16/109,814, filed on Aug. 23, 2018, now Pat. No. 10,506,092.

(51) Int. Cl.
*H04M 1/725* (2006.01)
*H04W 4/06* (2009.01)
*H04W 4/02* (2018.01)

(52) U.S. Cl.
CPC ... *H04M 1/72577* (2013.01); *H04M 1/72569* (2013.01); *H04M 1/72583* (2013.01); *H04W 4/027* (2013.01); *H04W 4/06* (2013.01)

(58) Field of Classification Search
CPC ......... H04M 1/72577; H04M 1/72569; H04M 1/72583; H04M 1/6075; H04W 4/046;
(Continued)

(56) References Cited

U.S. PATENT DOCUMENTS 9,094,800 B2 7/2015 Ren
9,661,127 B1 5/2017 Singh
(Continued)

FOREIGN PATENT DOCUMENTS

| CN | 201563241 U | 8/2010 |
| JP | 2005350018 A | 12/2005 |
| WO | 2018058239 A1 | 4/2018 |

OTHER PUBLICATIONS

"Cellular Phone Use and Texting While Driving Laws", National Conference of State Legislatures, Apr. 30, 2018, 3 pages, <http://www.ncsl.org/research/transportation/cellular-phone-use-and-texting-while-driving-laws.aspx>.
(Continued)

*Primary Examiner* — Nizar N Sivji
(74) *Attorney, Agent, or Firm* — Nolan M. Lawrence (57) ABSTRACT

A first client device detects driving of a vehicle. The first client device establishes a passenger operation network connection with a second client device. The first client device receives, based on the established network connection and based on the detected driving of the vehicle, at least one instruction directed towards a first client operation of the first client device. The first client device executes, responsive to the received at least one instruction and based on the established network, the first client operation.

20 Claims, 6 Drawing Sheets

(58) Field of Classification Search
CPC ....... H04W 48/04; H04W 4/027; H04W 4/48; H04W 4/029; H04W 4/06
See application file for complete search history.

(56) References Cited

U.S. PATENT DOCUMENTS

| | | |
|---|---|---|
| 2011/0164562 A1 | 7/2011 | Qiu et al. |
| 2011/0195699 A1 | 8/2011 | Tadayon et al. |
| 2013/0045677 A1 | 2/2013 | Chien |
| 2014/0106726 A1 | 4/2014 | Crosbie et al. |
| 2014/0120829 A1 | 5/2014 | Bhamidipati et al. |
| 2014/0163771 A1 | 6/2014 | Demeniuk |
| 2018/0015376 A1* | 1/2018 | Matsumoto ............. A63F 13/87 |
| 2019/0349470 A1* | 11/2019 | Abramson ......... G01C 21/3641 |

OTHER PUBLICATIONS

"OnStar In-Vehicle Safety and Security", Last printed Jun. 22, 2018, 5 pages, <https://www.onstar.com/us/en/home/>.

"Using a phone or a sat nav when driving", gov.uk, Last printed Jun. 22, 2018, 2 pages, <https://www.gov.uk/using-mobile-phones-when-driving-the-law>.

Bell, "Samsung has an app to keep you from texting and driving", Apr. 26, 2017, 2 pages, <https://mashable.com/2017/04/26/samsung-in-traffic-reply-app-texting-driving/#63n1P.CViiqV>.

Callaham, "Android to be built into future versions of Audi and Volvo cars", Android Authority, May 15, 2017, 5 pages, <https://www.androidauthority.com/android-audi-volvo-772041/>.

Etherington, "Nissan's Faraday cage armrest is the abstinence of mobile driving distraction", May 3, 2017, 3 pages, <https://techcrunch.com/2017/05/03/nissans-faraday-cage-armrest-is-the-abstinence-ofmobile-driving-distraction/>.

Mell et al., "The NIST Definition of Cloud Computing", National Institute of Standards and Technology, Special Publication 800-145, Sep. 2011, 7 pages.

Vergara, "Android Auto coming to Audi dashboards, no phone required", Android Authority, May 24, 2017, 8 pages, (https://www.androidauthority.com/android-auto-coming-audi-dashboards-no-phone-required-774969/>.

Stephenson et al., "Passenger Operation Network Concurrent with Vehicle Operation," U.S. Appl. No. 16/109,814, filed Aug. 23, 2018.
List of IBM Patents or Patent Applications Treated as Related, Signed Nov. 6, 2019, 2 pages.

* cited by examiner

PASSENGER OPERATION NETWORK CONCURRENT WITH VEHICLE OPERATION

BACKGROUND

Aspects of the present disclosure relate to portable electronic devices; more particular aspects relate to portable electronic device usage during driving of a vehicle.

Portable electronic devices operate in many use cases and situations. Portable electronic devices can be used during the operation of a vehicle for a variety of purposes (e.g., for GPS navigation and/or entertainment purposes). However, impractical use of portable electronic devices can become a safety hazard for vehicle occupants and for others in the vicinity.

SUMMARY

Aspects of the present disclosure are directed towards a computer-implemented method comprising detecting, by a first client device, driving of a vehicle. The method can further comprise establishing, by the first client device, a passenger operation network connection with a second client device. The first client device can be configured to receive one or more instructions by the passenger operation network connection. The method can further comprise receiving, by the first client device and based on the established passenger operation network connection with the second client device and based on the detected driving of the vehicle, at least one instruction directed towards a first client operation of the first client device. The method can further comprise executing, in response to the received at least one instruction and based on the established passenger operation network connection, the first client operation by the first client device.

Aspects of the present disclosure are directed toward a computer program product executable by a processor to perform a method comprising detecting, by a first client device, driving of a vehicle. A second client device is operable in a restricted operation mode during the driving of the vehicle. While in the restricted operation mode the second client device restricts a subset of client operations of the second client device. The computer program product further comprises establishing, by the first client device, a passenger operation network connection with the second client device. The passenger operation network connection can be configured to transmit at least one instruction from the first client device. The computer program product can further comprise transmitting, by the first client device and based on the established passenger operation network connection with the second client device and based on the detected driving of the vehicle, the at least one instruction directed towards a first client operation of the second client device.

Aspects of the present disclosure are directed toward a system for executing client operations during driving of a vehicle. The system can comprise a memory containing one or more program instructions. The system can further comprise a processor communicatively coupled to the memory. In response to reading the one or more program instructions the processor can be configured to detect, by a first client device, driving of a vehicle. The first client device can be operable in a restricted operation mode during the driving of the vehicle. While in the restricted operation mode the first client device restricts a subset of client operations of the first client device. The processor can be further configured to establish, by the first client device, a passenger operation network connection with a second client device. The passenger operation network connection can be configured to receive at least one instruction from the second client device. The processor can be further configured to receive, by the first client device and based on the established passenger operation network connection with the second client device and based on the detected driving of the vehicle, the at least one instruction directed towards a client operation of the first client device. The processor can be further configured to execute, in response to the received at least one instruction and based on the established passenger operation network connection, the first client operation by the first client device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to portable electronic devices; more particular aspects relate to portable electronic device usage during driving of a vehicle. While the present disclosure is not necessarily limited to such applications, various aspects of the disclosure may be appreciated through a discussion of various examples using this context.

While driving a vehicle an individual can often be distracted by a variety of things. These distractions can impair the individual's ability to drive, placing the driver, passengers, and others in the surrounding area at risk of harm. Distractions can come from a variety of sources; however, the cellular telephone and other portable electronic devices are among the largest causes of distracted driving.

Portable electronic devices (e.g., cell phones, smartphones, tablets, wearable electronic devices, etc.) enable an individual to perform a wide variety of operations. This includes, but is not limited to, making telephone calls, sending and receiving emails and SMS Messages, accessing the internet, listening to music, playing video, providing GPS navigation, interpreting voice commands, receiving traffic alerts, and utilizing features/operations of applications (e.g., preinstalled applications, third-party applications, downloaded games, user-installed utilities, etc.). While a number of these operations can be helpful to the driver of a vehicle (e.g., providing GPS navigation, interpreting voice commands, receiving traffic alerts, etc.), many operations performed by portable electronic devices can be extremely distracting and can be a safety hazard if used while driving.

Jurisdictions and cell phone manufacturers have made attempts to mitigate the risks of distracted driving due to the use of portable electronic devices. Many jurisdictions have made it illegal for individuals to text while driving or to use cell phones (alternatively, smart phones) without the use of a hands-free device (e.g., a Bluetooth earpiece). Additionally, most cell phones include settings which prevent individuals from receiving notifications while driving, reducing the potential for distraction. Certain cell phones can also send automated reply messages while the person is driving, informing others that the driver is currently unavailable. While these regulations and features can help to prevent distracted driving, none of these solutions allow a driver to safely use a portable electronic device while driving.

This technological problem is unique as it can be caused specifically by the configuration of the portable electronic devices. First, cell phones are often designed to be used in mobile environments, such as in cars and on the go, which necessitates a smaller size for hand-held operation or storage in a pocket. The smaller size correspondingly forces a smaller display size on some cell phones. Second, cell phone technology can focus on packing multiple functions (e.g., tens, thousands, etc.) onto a screen-based touch display. The screen-based touch display includes often thousands or more different symbols and glyphs, which require the user to gaze, look, or even read to conduct successful operations. Further, certain configurations of cell phones involve lock screens and restricted modes that are always activated; always active settings can prevent users from using certain functionalities of the phone if any vehicle operation is detected. The restricted modes may cause users to miss or be unable to respond to urgent and needed messages. These technological restrictions in some cases cannot be removed from cell phones. The configuration of the cell phone in the restricted mode creates a technological conflict with cell phone usage.

In one approach to using portable electronic devices, a vehicle may be equipped with a hands-free system utilizing voice commands. However, these systems can misunderstand user commands, have limited capabilities, and pairing is often vehicle-dependent. For example, in a household with multiple drivers sharing a vehicle, users have to reconnect devices each time a different driver uses the vehicle. Additionally, when multiple users are riding together, the vehicle is unaware of which client device belongs to the driver and can connect to the wrong device.

Another approach is for the driver's device to connect to a head unit (e.g., stereo, navigation, infotainment system, etc.) of the vehicle. The driver may then receive information and perform a subset of operations on the head unit of the vehicle, rather than on the portable electronic device. However, these systems are often limited in their capabilities and, depending on the vehicle, are unable to perform all the operations of a particular client device. Additionally, many of the capabilities of this type of system still require driver operation of the head unit and can distract the driver.

Another approach would be for a driver to utilize a paid service (e.g., ONSTAR, MBRACE, etc.) for requesting navigation routes and other information sent to the vehicle from the paid service through a network connection. However, this requires a connection to the service and a paid subscription. Also, not all vehicles are equipped with this type of service, limiting its capabilities. Additionally, this type of service fails to allow for communication between users or between vehicles (e.g., individuals can own multiple vehicles from differing brands preventing them from using the same service for all vehicles).

Another approach would be for a driver to hand their device to a passenger and for the passenger to perform the desired operation. This may occur in various instances, such as taxis, car pools, ride/car sharing services, buses, and other public transportation. However, this provides the passenger with full access to the driver's device and, consequently, the driver's personal information. Additionally, the driver device is likely to have some type of lock-out security requiring the driver to provide either a passcode or some type of biometric measurement. Thus, this solution can be impractical and relies on the driver and passenger being in close physical proximity to each other.

Embodiments of the present disclosure allow a passenger, or other individual, to send instructions to the driver's device (alternatively, a client device) without allowing full access to the device itself. Some embodiments of the present disclosure include a driver's device detecting driving of a vehicle. The driver's device can operate in a restricted operation mode, which can restrict all operations or a subset of operations during the driving of the vehicle. The driver's device can establish a passenger operation network connection with a passenger's device to receive at least one instruction from the passenger's device. The driver's device can receive, based on the passenger operation network connection and the detected driving of the vehicle, the instruction directed toward an operation on the driver's device. The driver's device can execute the instruction to perform an operation on the driver's device.

Aspects of the present disclosure provide numerous advantages. First, aspects of the present disclosure allow utilization of the driver's device without the driver becoming distracted during driving of the vehicle. Second, aspects of the present disclosure maintain the security of the driver's personal information contained on the driver's device, since the operations are performed on the driver's device without providing the passenger access to personal information stored on the driver's device. Third, aspects of the present disclosure work with or override existing configurations of the driver's device. Thus the technological problem of the functionality of the device being locked or restricted is resolved.

The aforementioned advantages are example advantages and not all advantages are listed. Furthermore, embodiments of the present disclosure exist that can contain all, some, or none of the aforementioned advantages while remaining within the spirit and scope of the present disclosure.

Figure 1:
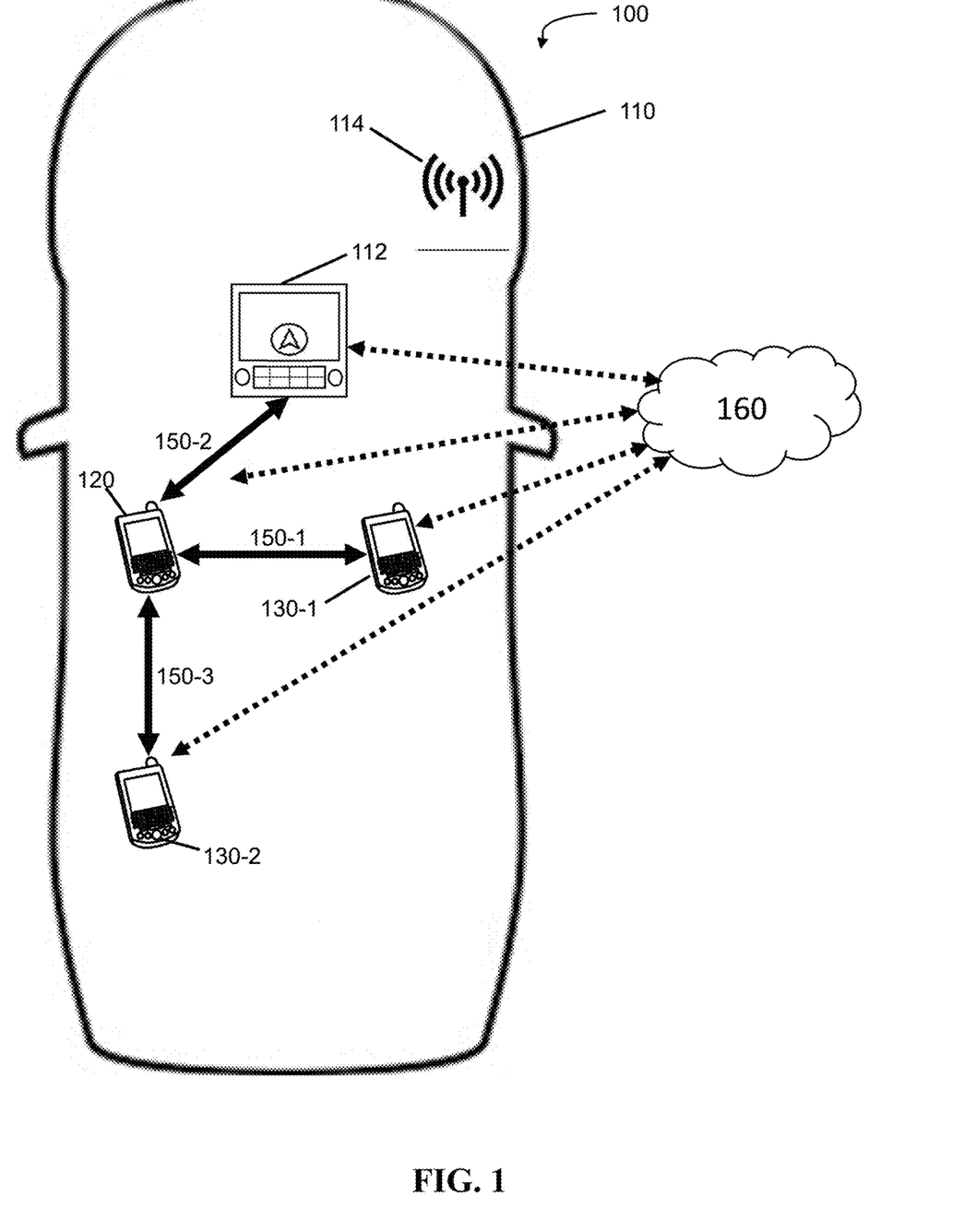
FIG. 1 depicts an example passenger operation network system in accordance with embodiments of the present disclosure.

Referring now to FIG. 1, illustrated is a block diagram of an example passenger operation network system 100 in accordance with some embodiments of the present disclosure. Passenger operation network system 100 can comprise a vehicle 110, a driver device 120 (first client device), and at least one second client device 130-1 and 130-2 (collectively 130) (passenger device). The first client device and other client devices can establish one or more additional passenger operation networks 150-1, 150-2, 150-3 (collectively 150). A given passenger operation network 150 (alternatively, passenger operation network connection 150) communicatively couples the driver device 120 to the second client device 130. In some embodiments, the first device 120 and the second client device 130 can alternatively be communicatively coupled by means of network 160 such as, for example, a cellular network, a wi-fi network, or an internet connection. In some embodiments, the vehicle 110 provides network 160 (e.g., a vehicle-installed mobile hotspot).

The driver device 120 can operate in a restricted operation mode during driving of the vehicle 110. The restricted operation mode can restrict a subset of client operations on the driver device 120. The driver device 120 can be configured to receive, from the second client device 130, at least one instruction directed towards a first client operation of the driver device 120. For example, second client device 130-2 can send the at least one instruction through respective passenger operation network 150-3. The first client operation can be executed by the driver device 120 in response to the at least one instruction received from the second client device 130.

In some embodiments, the passenger operation network system 100 can further comprise an auxiliary device 112 (third client device). The auxiliary device 112 can be communicatively coupled to the driver device 120 by passenger operation network 150-2. The auxiliary device 112 can comprise, but is not limited to, a head unit of the vehicle 110, a global positioning system (GPS) unit, a Bluetooth headset, a portable electronic device, and/or a wearable electronic device. The driver device 120 can send information to the auxiliary device 112 such as display information (e.g., GPS navigation route, traffic information, weather information, etc.) and audio files (e.g., music, phone calls, etc.).

In some embodiments, driving of the vehicle 110 can comprise intentionally manipulating some mechanical or electrical part of the vehicle 110—like the gear shift or the ignition—which, alone or in sequence, will set the vehicle 110 in motion. In some embodiments, driving can comprise manipulating any component of the vehicle 110 with or without the intention of setting the vehicle 110 in motion (e.g., unlocking the vehicle, fastening a seatbelt, turning the ignition to auxiliary power to enable radio functionality, etc.).

In some embodiments, driving of the vehicle 110 can be detected by means of a sensor internal to the driver device 120 (e.g., GPS sensor, accelerometer, gyroscope, barometer, magnetometer, etc.). For example, using the accelerometer, the driver device 120 can measure acceleration of the sensor over a period of time. By integrating the measured acceleration of the sensor, the driver device 120 can determine the speed at which the sensor is traveling to determine if it exceeds a threshold value (e.g., 10 m.p.h., 15 m.p.h. 20 m.p.h., etc.). When the threshold value is reached or exceeded, the driver device 120 can detect driving of the vehicle 110. In some embodiments, driving of the vehicle 110 can be detected by means of a sensor external to the driver device 120, such as vehicle sensor 114 (e.g., wheel speed sensor, gear position sensor, engine speed sensor, engine temperature sensor, ignition sensor, electronic parking brake sensors, automatic windscreen wiper sensors, Infrared (IR) sensor arrays, solar sensors, magnetometers, accelerometers, etc.). For example, some vehicles use wheel speed sensors to detect movement of the vehicle. If movement is detected by the wheel speed sensor a signal could be sent to the driver device 120 indicating the driving of the vehicle 110. In some embodiments, driving the vehicle can be detected by means of a connection between the driver device 120 and the auxiliary device 112. In some embodiments, a combination of the aforementioned methods can be used. For example, driving can be detected by a combination of measurements from sensors internal to the driver device 120 and sensors external to the driver device 120 (e.g., an accelerometer internal to the driver device 120 may determine the first client device is travelling at a speed above a threshold value and a gear position sensor indicates the vehicle 110 is not in park indicating driving of the vehicle 110).

In some embodiments, the driver device 120 is not the auxiliary device 112 of the vehicle 110. For example, the auxiliary device 112 can be a head unit 112 of the vehicle 110. Thus, the driver device 120 is not the head unit 112 of the vehicle 110, not the vehicle 110, and/or not otherwise associated with or connected to the vehicle 110. In some embodiments, the second client device 130 is not the head unit 112 of the vehicle 110, not the vehicle 110, and/or not otherwise associated with or connected to the vehicle 110 and sends and receives data to the driver device 120 without any knowledge of the vehicle 110. The driver device 120 may, for example, send only automotive or infotainment commands based on a preexisting vehicle industry or vehicle industry adopted protocol—such as USB—and without knowledge of the type of head unit 112 or even vehicle 110.

In some embodiments, the driver device 120 can operate in a restricted operation mode which restricts the user from all operations of the driver device 120 or restricts the user from a subset of operations of the driver device 120 (e.g., restrict SMS messaging, Email, and the sending and receiving of phone calls; but allow media controls, traffic alerts, and GPS navigation). The restricted operation mode can be manually entered into by a user, initiated by the detection of the driving of the vehicle 110, and/or initiated by an instruction received by the second client device 130. In some embodiments, the first client operation can be contained in the subset of restricted operations. The driver device 120 can determine, based on the detected driving of the vehicle, the operation of the driver device 120 is restricted; ignore, based on the at least one instruction, the restriction of the operation of the driver device 120; and execute the at least one instruction performing the restricted first client operation.

In some embodiments, the passenger operation network connection 150 comprises, but is not limited to, a personal area network (PAN) (e.g., a Bluetooth connection, a near field communication (NFC) connection, a radio frequency identification (RFID) connection, an infrared (IR) communication, an ultrasonic communication, a wireless local area network (WLAN) and/or a physical network (e.g., parallel interface cable, USB cable, etc.). In some embodiments, establishing the passenger operation network 150 comprises receiving input (e.g., a trust token, device identifier, etc.) indicating the second client device 130 is a trusted device. In some embodiments, a permission list (e.g., contacts list, social media connections list, trusted devices list, etc.) can indicate the second client device 130 is a trusted device. The permission list can indicate a subset of allowable first client operations for the second client device 130 to instruct (e.g., allow, based on the permission list, the second client device 130 access to media controls, but ignore instructions relating to all other first client operations).

In some embodiments, the second client device 130 is a trusted device based on an indication that the second client device 130 and the driver device 120 are both within a passenger area (e.g., passenger compartment, truck cab, truck bed, etc.) of the vehicle 110. For example, the driver device 120 may collect data from internal sensors (e.g., accelerometer, gyroscope, lux sensor, barometer, magnetometer, etc.) and compare it to data from internal sensor data from the second client device to determine the driver device 120 and the second client device 130 are both within a passenger area of the vehicle indicating that the second client device 130 is a trusted device.

The second client device 130 can comprise, but is not limited to, a smartphone, tablet, laptop, wearable electronic device, desktop computer, and/or a home assistant (e.g., GOOGLE HOME, AMAZON ECHO, etc.). In some embodiments, the second client device 130 is within the passenger area of the vehicle 110. In some embodiments, the second client device 130 can operate outside the passenger area of the vehicle 110 such as from a remote location (e.g., a home, an office, a restaurant, etc.).

In some embodiments, the at least one instruction can be comprised of, but not limited to, an instruction to perform a first client operation relating to map data, traffic information, audio files, audio metadata, weather information, phone calls/phone call metadata, SMS message data, email data, contact information, and media commands. In some embodiments, the driver device 120 can be depicted as a share menu target (share target) of an application of the second client device 130.

In some embodiments, the at least one instruction from the second client device 130 can include at least one data element (e.g., email recipient address, email subject line, email body, email attachments; SMS message recipient phone number, SMS message, SMS message attachments; social media platform identifier, social media status update, attachment to be uploaded to social media account; etc.). Executing the at least one instruction can further comprise performing the at least one instruction with the at least one data element (e.g., sending the email from an email account associated with the driver device 120 with the received data elements). Additionally, in some embodiments, the driver device 120 can forward received messages (e.g., emails, SMS messages, voicemails, etc.) and notifications to the second client device 130. The second client device 130 can access the forwarded content and reply to the message or notification with the at least one instruction including data elements. Based on the at least one instruction the driver device 120 can execute the at least one instruction with the included data elements (e.g., send a reply email or SMS message).

In some embodiments, a conclusion of the driving of the vehicle 110 can be detected by the driver device 120. The conclusion of the driving of the vehicle 110 can be detected by means of a sensor internal to the driver device 120 (e.g., GPS sensor, accelerometer, gyroscope, barometer, magnetometer, etc.). For example, using the accelerometer, the device could measure acceleration of the sensor over a period of time. By integrating the measured acceleration of the sensor, the device could determine the speed at which the sensor was traveling to determine if it falls below a threshold value (e.g., 12 k.p.h., 25 k.p.h., 30 k.p.h., etc.). When the sensor falls below the threshold value the driver device 120 could detect the conclusion of the driving of the vehicle 110. In some embodiments, the conclusion of the driving of the vehicle 110 may be detected by means of a sensor external to the driver device 120 such as vehicle sensor 114 (e.g., wheel speed sensor, gear position sensor, engine speed sensor, engine temperature sensor, ignition sensor, electronic parking brake sensors, automatic windscreen wiper sensors, Infrared (IR) sensor arrays, solar sensors, magnetometers, accelerometers, etc.). For example, some vehicles use wheel speed sensors to detect movement of the vehicle. If movement is no longer detected by the wheel speed sensor a signal could be sent to the driver device 120 indicating the conclusion of the driving of the vehicle 110. In some embodiments, driving the vehicle 110 can be detected by means of a connection between the driver device 120 and the auxiliary device 112. In some embodiments, a combination of the aforementioned methods can be used. For example, the conclusion of the driving of the vehicle 110 can be detected by a combination of measurements from sensors internal to the driver device 120 and sensors external to the driver device 120 (e.g., an accelerometer internal to the driver device 120 can determine the first client device is travelling at a speed below a threshold value and a gear position sensor can indicate the vehicle 110 is in park indicating the conclusion of the driving of the vehicle).

Figure 2:
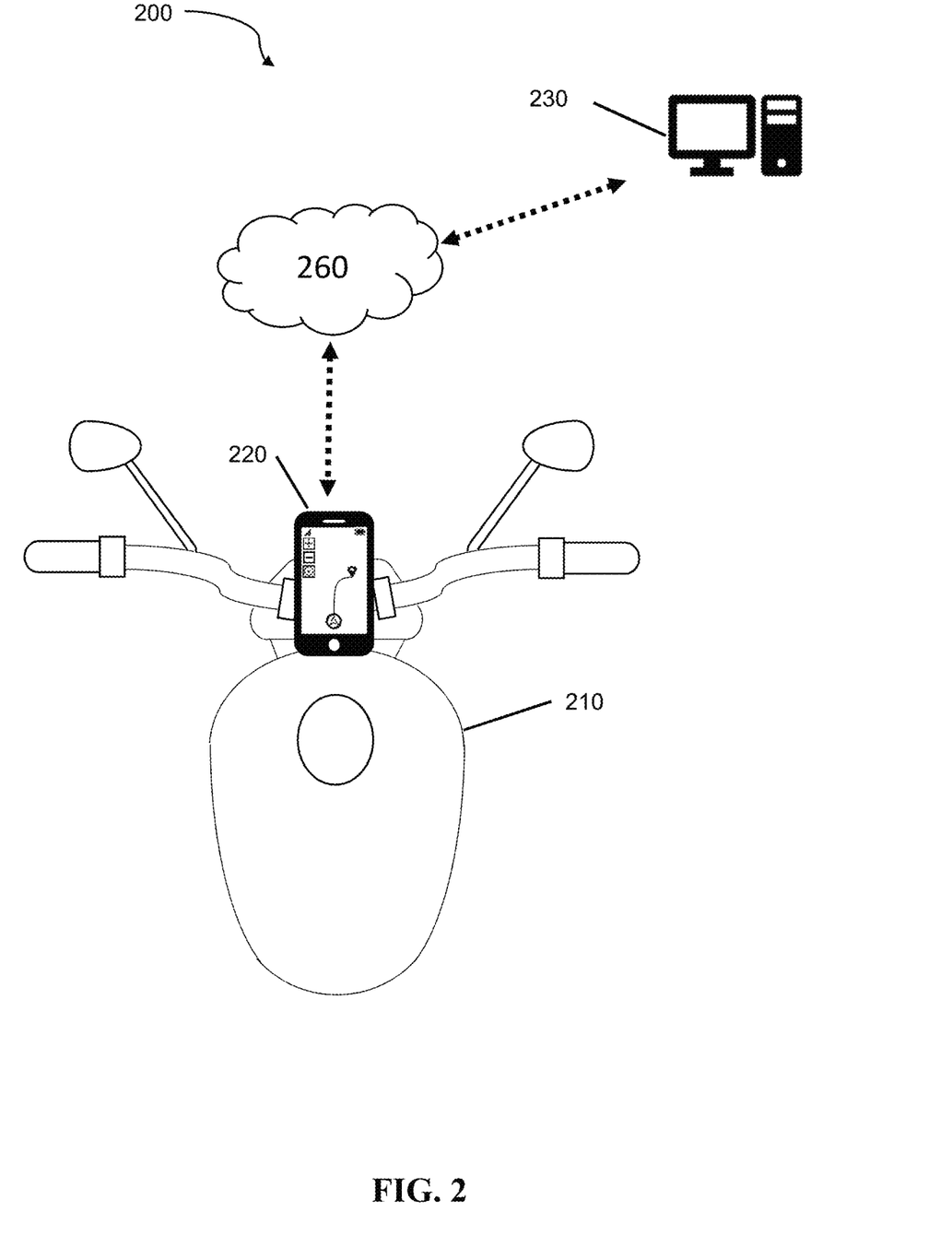
FIG. 2 depicts an example passenger operation network system in accordance with embodiments of the present disclosure.

Referring now to FIG. 2 illustrated is an example passenger operation network system 200 in accordance with some embodiments of the present disclosure. Passenger operation network system 200 comprises a vehicle 210, a first client device 220, and at least one second client device 230. The vehicle 210 in the passenger operation network system 200 is represented by the handlebars and gas-tank of a motorcycle. Though vehicle 210 is represented by a motorcycle, other vehicles (e.g., cars, pedal-power cycles, etc.) may be contemplated. The first client device 220 and the second client device 230 can be communicatively coupled by means of network 260 (alternatively, network connection 260) such as, for example, a cellular network or an internet connection.

The first client device 220 can operate in a restricted operation mode during driving of the vehicle 210. The restricted operation mode can restrict all client operations of the first client device 220 or restrict a subset of client operations on the first client device. The first client device 220 can be configured to receive, from the second client device 230, at least one instruction directed towards a first client operation of the first client device 220. The first client operation can be executed by the first client device 220 in response to the at least one instruction received from the second client device 230.

In some embodiments, the passenger operation network system 200 can further comprise a third client device (not pictured). The third client device can be communicatively coupled to the first client device 220. The third client device can comprise, but is not limited to, a Bluetooth headset and/or a wearable electronic device. The first client device 220 can send information to the third client device such as, for example, audio files (e.g., music, phone calls, etc.). In some embodiments, the first client device 220 is not the third client device. In some embodiments, the second client device 130 is not the third client device.

In some embodiments, driving of the vehicle 210 can comprise intentionally manipulating some mechanical or electrical part of the vehicle 210—like the gear shift or the ignition—which, alone or in sequence, will set the vehicle 210 in motion. In some embodiments, driving can comprise manipulating any component of the vehicle 210 with or without the intention of setting the vehicle 210 in motion (e.g., turning the key to the 'on' position, turning the key to the 'start' positions).

In some embodiments, driving of the vehicle 210 can be detected by means of a sensor internal to the first client device 220 (e.g., GPS sensor, accelerometer, gyroscope, barometer, magnetometer, etc.). For example, using the accelerometer, the first client device 220 can measure acceleration of the sensor over a period of time. By integrating the measured acceleration of the sensor, the first client device 220 can determine the speed at which the sensor is traveling to determine if it exceeds a threshold value (e.g., 10 m.p.h., 15 m.p.h., 20 m.p.h., etc.). When the threshold value is reached or exceeded the first client device 220 can detect driving of the vehicle 210.

In some embodiments, the restricted operation mode can be manually entered into by a user and/or initiated by the detection of the driving of the vehicle 210. The first client operation can be contained in a subset of restricted operations. The first client device 220 can determine, based on the detected driving of the vehicle, the operation of the first client device 220 is restricted; ignore, based on the at least one instruction, the restriction of the operation of the first client device 220; and execute the at least one instruction performing the restricted first client operation.

In some embodiments, establishing the network connection 260 comprises receiving input (e.g., a trust token, device identifier, etc.) indicating the second client device 230 is a trusted device. In some embodiments, a permission list (e.g., contacts list, social media connections list, trusted devices list, etc.) can indicate the second client device 230 is a trusted device. The permission list can indicate a subset of allowable first client operations for the second client device 230 to instruct (e.g., allow, based on the permission list, the second client device 230 access to navigation controls but ignore instructions relating to all other first client operations). In some embodiments, the second client device 230 being within a specified proximity to the first client device 220 can indicate the second client device is a trusted device (e.g., within 3 ft., 5 ft., 10 ft., etc.). For example, the first client device 220, upon establishing the network connection 260 with the second client device 230 can send a packet (a packet specific to proximity determination, an existing acknowledgement or handshake packet) to the second client device and wait for a response. Continuing the example, the first client device 220 can then, based on the response time for the packet, determine the distance between the first client device and the second client device 230.

In some embodiments, the at least one instruction can be comprised of, but not limited to, an instruction to perform a first client operation relating to map data, traffic information, audio files, audio metadata, weather information, phone calls/phone call metadata, SMS message data, email data, contact information, and media commands.

The second client device 230 can comprise, but is not limited to, a smartphone, tablet, laptop, wearable electronic device, desktop computer, and/or a home assistant. In some embodiments, the second client device 130 can operate outside the passenger area of the vehicle 110 such as from a remote location (e.g., a home, an office, a restaurant, etc.). For example, an individual can be driving vehicle 210 on a freeway and need navigation instructions to a location. The individual, using a handsfree device, could call a friend and request that directions to the location be sent to the first client device 220. The friend can send the directions to the first client device 220 by means of second client device 230. The second client device 230 may bundle the content, in this example the navigation instructions, along with device instructions to perform client operations to the first client device 220. The first client device 220, upon receipt of the instructions to perform client operations, can automatically retrieve the navigation instruction through a cellular connection. Further continuing the example, and based on receiving the instruction to perform client operations, the second client device 220, can automatically (e.g., without any action by the individual driving the vehicle 210) display the navigation instructions for the user. Thus, the individual driving the vehicle 210 can receive the directions to the location without the need to attempt to enter the information personally or the need to pull to the side of the freeway, each creating a potential traffic hazard.

In some embodiments, a conclusion of the driving of the vehicle 210 can be detected by the first client device 220. The conclusion of the driving of the vehicle 210 can be detected by means of a sensor internal to the first client device 220 (e.g., GPS sensor, accelerometer, gyroscope, barometer, magnetometer, etc.). For example, using the accelerometer, the device could measure acceleration of the sensor over a period of time. By integrating the measured acceleration of the sensor, the device could determine the speed at which the sensor was traveling to determine if it falls below a threshold value (e.g., 10 m.p.h., 15 m.p.h. 20 m.p.h., etc.). When the sensor falls below the threshold value the first client device 220 could detect the conclusion of the driving of the vehicle 210.

Figure 3:
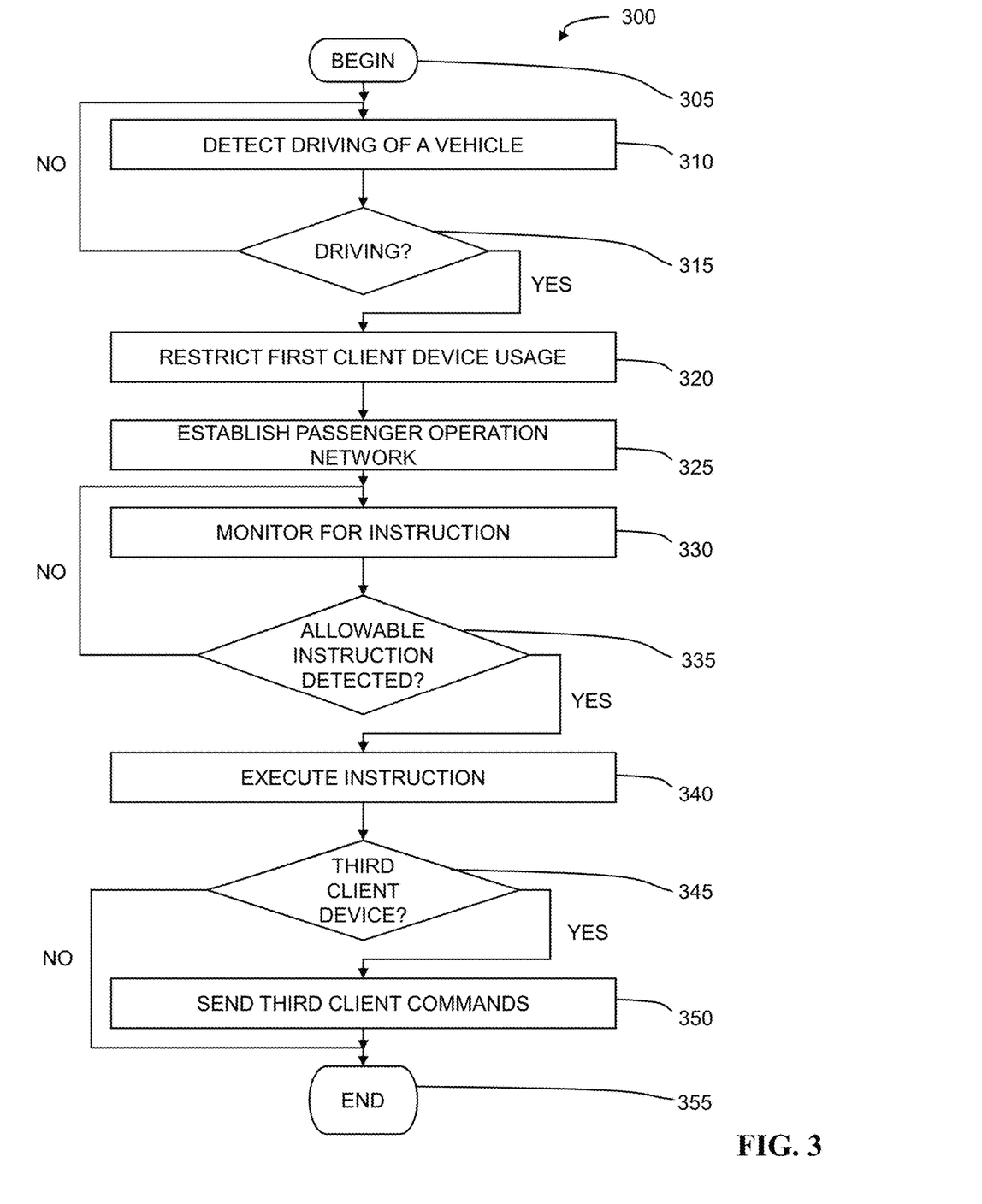
FIG. 3 depicts an example method of establishing and utilizing a passenger operation network in accordance with embodiments of the present disclosure.
Figure 6:
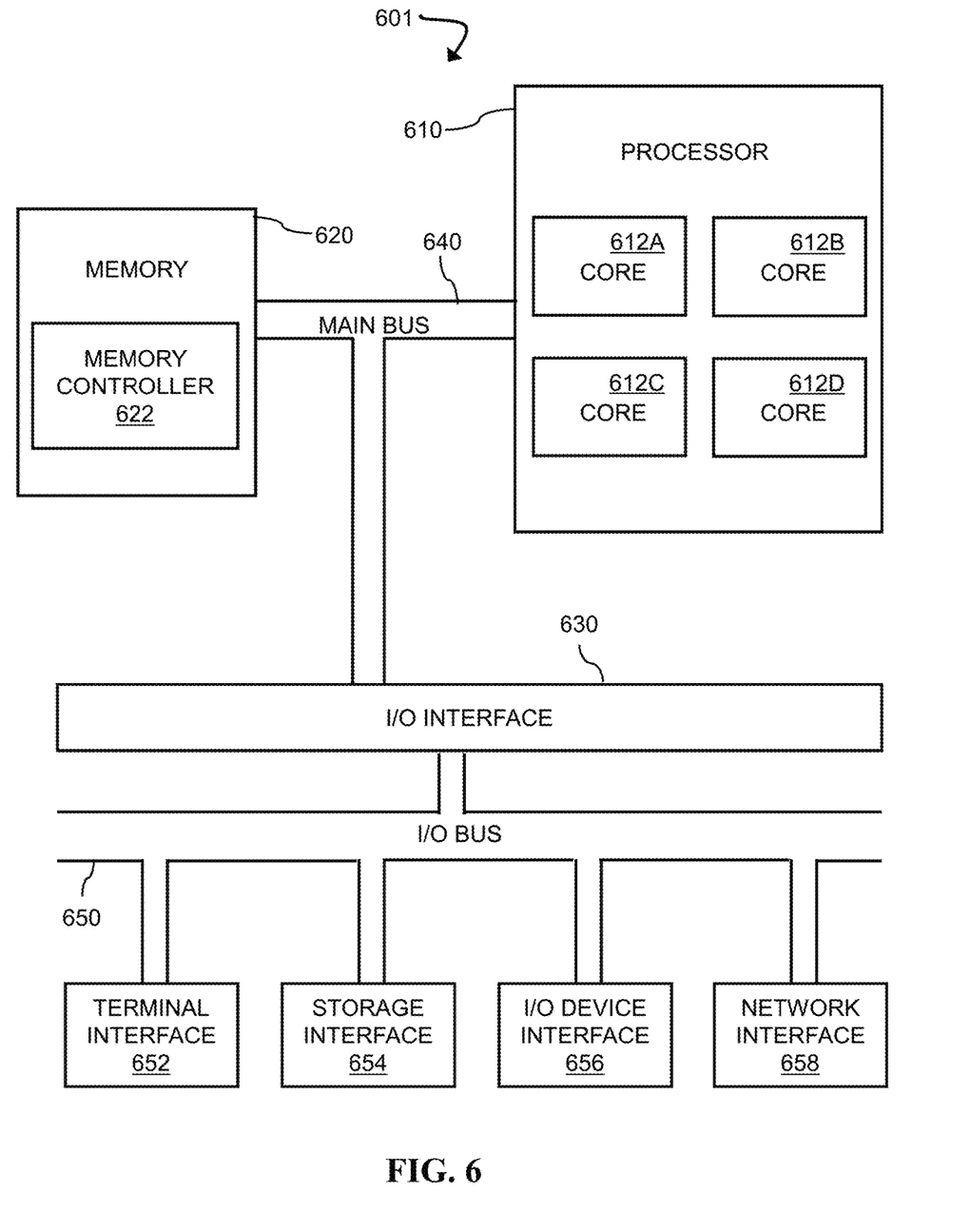
FIG. 6 depicts the representative major components of an example computer system that may be used in accordance with embodiments of the present disclosure.

Referring now to FIG. 3 illustrated is an example method 300 of establishing and utilizing a passenger operation network in accordance with embodiments of the present disclosure. Method 300 can be executed by a software program running on a first client device (e.g., driver device 120 of FIG. 1) consistent with embodiments of the present disclosure. In some embodiments, parts or all of method 300 can be executed by a second client device (e.g., second client device 130 of FIG. 1). Method 300 may be executed by a client device as part of a passenger operation network; FIG. 6 depicts an example computer system that may be utilized to perform one or more steps of method 300.

From start 305, the program can detect driving of a vehicle (e.g., vehicle 110 of FIG. 1) at 310. In some embodiments, driving of the vehicle can comprise intentionally manipulating some mechanical or electrical part of the vehicle—like the gear shift or the ignition—which, alone or in sequence, will set the vehicle in motion. In some embodiments, driving can comprise manipulating any component of the vehicle with or without the intention of setting the vehicle in motion (e.g., starting the engine).

In some embodiments, driving of the vehicle can be detected at 310 by means of a sensor internal to the first client device. In some embodiments, driving of the vehicle can be detected at 310 by means of a sensor external to the first client device. In some embodiments, driving the vehicle can be detected at 310 by means of a connection between the first client device and a third client device (e.g., auxiliary device 112 of FIG. 1). In some embodiments, detection of the driving of the vehicle at 310 can be in response to determining the first client device is operating in a restricted mode. In some embodiments, driving can be detected at 310 by input received by the first client device, such as, input received from the first client device user or input received from the second client device. In some embodiments, a combination of the aforementioned driving detections can be used.

At 315 the first client device can determine whether driving of the vehicle is detected at 310. If the first client device determines at 315 that driving of the vehicle was not detected at 310 the first client device can continue to monitor for a detection of the driving of the vehicle. If the first client device determines at 315 that driving of the vehicle was detected at 310 the first client device can optionally restrict usage of the first client device at 320 by initiating a restricted operation mode. Restricting usage at 320 can include restricting all, or a subset of, client operations of the first client device. In some embodiments, the first client device can already be operating in a restricted operation mode or the first client device can detect driving of a vehicle at 310 without initiating the restricted operation mode at 320. In some embodiments, restricted operation mode can be initiated at 320 by input received by the first client device, such as, input received from the first client device user or input received from the second client device.

At 325 the first client device can establish a passenger operation network (e.g., passenger operation network 150-1 of FIG. 1). In some embodiments, establishing a passenger operation network at 325 can comprise, but is not limited to, monitoring for the second client device, detecting the second client device, determining the second client device is a trusted device, and establishing communication with the second client device. For example, in embodiments where the passenger operation network utilizes a Bluetooth connection the first client device can be set to a discoverable mode. The second client device can find the first client device and attempt to establish a connection. When the first client device and the second client device find each other the first client device can prompt the second client device for a passkey. The second client device can send the passkey, and if the passkey matches a passkey of the first client device a trusted pair can be formed. Based on the trusted pair being formed, the first client device can establish the passenger operation network at 325. In some embodiments, a device identifier of the second client device may be stored by the first client device indicating the second client device is a trusted device. Future passenger operation networks can be established based on the stored device identifier without the need for a passkey or other trust token.

In some embodiments, the second client device can be determined to be a trusted device by comparing sensor data of the first client device with sensor data of the second client device. For example, a GPS sensor of the first client device can indicate a first set of coordinates of a specified quantity (e.g., 5 sets of coordinates, 10 sets of coordinates, etc.) at a specified time interval (e.g., every second, every 3 seconds, every minute, etc.). A GPS sensor of the second client device can indicate a second set of coordinates of a specified quantity (e.g., 5 sets of coordinates, 10 sets of coordinates, etc.) at a specified time interval (e.g., every second, every 3 seconds, every minute, etc.). The first client device can receive the second set of coordinates from the second client device and compare the first set of coordinates with the second set of coordinates by performing a single factor analysis of variance test. If the analysis of variance test indicates the difference between the first set of coordinates and the second set of coordinates is not statistically significant (e.g., P-value>0.01, P-value>0.05, etc.) the first client device can determine the second client device is a trusted device.

Another example of a suitable test that may be performed is accelerometer readings based upon time. For example, a first client device can receive from a second client device, sensor readings from an accelerometer embedded within the second client device. The first client device can compare the received accelerometer readings to accelerometer readings in the first client device. Continuing the example, the second client device sends the following accelerometer readings: 0.07 m/s$^2$ at 1 second after 3 pm EST, 0.12 m/s$^2$ at 2 seconds after, 0.3 m/s$^2$ at 3 seconds after, 0.29 m/s$^2$ at 4 seconds after, and 0.02 m/s$^2$ at 5 seconds after. The received sensor readings are compared to the following internal accelerometer readings of the first client device: 0.05 m/s$^2$ at 1 second after 3 pm EST, 0.11 m/s$^2$ at 2 seconds after, 0.3 m/s$^2$ at 3 seconds after, 0.275 m/s$^2$ at 4 seconds after, and 0.021 m/s$^2$ at 5 seconds after. By comparing each sensor reading at corresponding times, the first client device can determine that the readings are sufficiently similar (e.g., within a suitable margin of error) to determine that the first client device and the second client device are moving sufficiently similar to each other (e.g., that they are in the same vehicle).

In some embodiments, the established passenger operation network can comprise a current session. The current session can comprise an amount of time the two devices maintain communication without terminating the established passenger operation network connection. Termination of the current session can be based on, but is not limited to, termination by the user of first client device or the user of the second client device, termination based on detection that the driving of the vehicle has concluded, or termination based on a difference between the sensor data of the first client device and the sensor data of the second client device.

In some embodiments, the first client device can manage multiple established passenger operation networks (e.g., passenger operation networks 150-1, 150-2, and 150-3 of FIG. 1) with multiple client devices (e.g., second client device 130-1 of FIG. 1, second client device 130-2 of FIG. 1, and auxiliary device 112 of FIG. 1). In embodiments with multiple passenger operation networks the first client device can establish passenger operation networks and terminate passenger operation networks, receive instructions from multiple devices, and execute the respective instructions without respect to the other passenger operation networks. For example, in an embodiment where the first client device has an established network (e.g., passenger operation network 150-1 of FIG. 1) with a second client device (e.g., second client device 130-1 of FIG. 1) and a passenger operation network (e.g., passenger operation network 150-2 of FIG. 1) with a third client device (e.g., auxiliary device 112 of FIG. 1) the passenger operation network with the third client device would not be interrupted if the passenger operation network with the second client device were terminated (e.g., a passenger exits the vehicle). In embodiments with multiple passenger operation networks with multiple client devices instructions from one client device can take priority over instructions from another client device (e.g., if conflicting media instructions are received from multiple second client devices the first client device can give priority to one second client device over the other second client device).

At 330 the first client device can monitor for at least one instruction. For example, the first client device can receive at least one instruction at 330. In a second example, the second client device can transmit at least one instruction at 330. The at least one instruction can comprise, but is not limited to, an instruction for the first client device to perform a first client operation relating to map data, traffic information, audio files, audio metadata, weather information, phone calls/phone call metadata, SMS message data, email data, contact information, and media commands. In some embodiments, the at least one instruction can originate from the first client device and can include at least one data element (e.g., elements for a received email; elements for a received SMS message; elements for received social media direct message; etc.).

For example, data elements of an email may be, a from line including the sender of the email, a title of the email, and a body of the email received by the first client device from the sender of the email (e.g., from another client device not the first client device, the second client device, or any other device that forms part of the passenger operation network or any portion of the vehicle). The second client device can receive the at least one instruction and reply with at least one reply instruction containing at least one reply data element (e.g., elements for a reply email, elements for a reply SMS message, elements for a reply social media direct message, etc.).

Continuing the example, reply data elements may include the intended recipient of the email, a title of the email, and a body of the email to be sent by the first client device to the intended recipient and composed by the second client device before being sent to the first client device. In some embodiments, the second client device receives a "message sent" status indicative that the first client device sent the email that was composed by the second client device and indicative that the recipient received the email from the first client device (e.g., a delivery status).

At 335 the first client device can detect if the at least one instruction is an allowable instruction. Detection of the allowable instruction at 335 can comprise, but is not limited to, receipt of a packet from the second client device, receipt of an acknowledgement packet for an instruction originating from the first client device, and/or the emptying of an outbound queue. Allowability of the at least one instruction can be detected at 335 by means of a permissions list (e.g., contacts list, social media connections list, trusted devices list, etc.). For example, second client device(s) on the trusted devices list can be allowed to instruct the first client device to execute operations at 340 relating to GPS navigation and media controls but cannot instruct the first client device to execute operations relating to emails, SMS messages, and/or social media. In some embodiments, the permissions list can include specific actions allowed for each second client device on the same permission list. For example, a user of the first client device can allow second client device belonging to a friend limited access to first client operations (e.g., only GPS navigation), but can allow a second client device belonging to a spouse full access to available first client operations.

In some embodiments, the first client device can detect that a received instruction is not allowed at 335. If the first client device detects an instruction that is not allowed at 335 it will ignore the instruction and continue to monitor for at least one instruction at 330. In some embodiments, if the first client device detects an instruction that is not allowed the first client device can send a message to the second client indicating that the instruction is not allowed. In some embodiments, the second client device, based on the receipt of the message indicating that the instruction is not allowed, can request permission to instruct the first client device to execute the at least one instruction at 340. The request can be sent from the second client device to the first client device and can be displayed on a user interface of the first client device. The user of the first client device can respond to the request allowing the instruction or denying the request. In some embodiments, the response from the user of the first client device can allow the instruction to be performed permanently, allow the instruction to be performed for the current session (e.g., allowed based on the current established passenger operation network connection but restricted for future established passenger operation network connections with the second client device), deny the instruction permanently, or deny the instruction for the current session.

At 340 the first client device can execute the at least one instruction. Execution of the at least on instruction at 340 can comprise, but is not limited to, entering an address into a mapping/navigation application, executing media commands, displaying traffic information, streaming media received from the second client device, making a phone call, sending an email, sending an SMS message, updating contact information, and/or updating weather information. In some embodiments, the first client device can execute the at least one instruction at 340 and continue to monitor for additional instructions at 330 and execute the additional instructions at 340 without terminating the current session. In embodiments where multiple instructions are received priority can be given to one type of instruction over another (e.g., instruction relating to navigation and traffic information can take priority over instructions relating to media and entertainment).

At 345 the first client device can determine the presence of a third client device in networked communication with the first client device. If the first client device determines no third client device is present at 345 method 300 ends at 355. In embodiments where a third client device is present the first client device can send commands to the third client device (e.g., navigation commands to a GPS unit, media commands to an audio system, phone call commands to a handsfree device, etc.) at 350. Method 300 ends at 355. The ending of method 300 at 355 can be initiated upon completion of the execution of the at least one instruction. In some embodiments, the method 300 can end at 355 based upon the termination of the current session of the passenger operation network.

Figure 4:
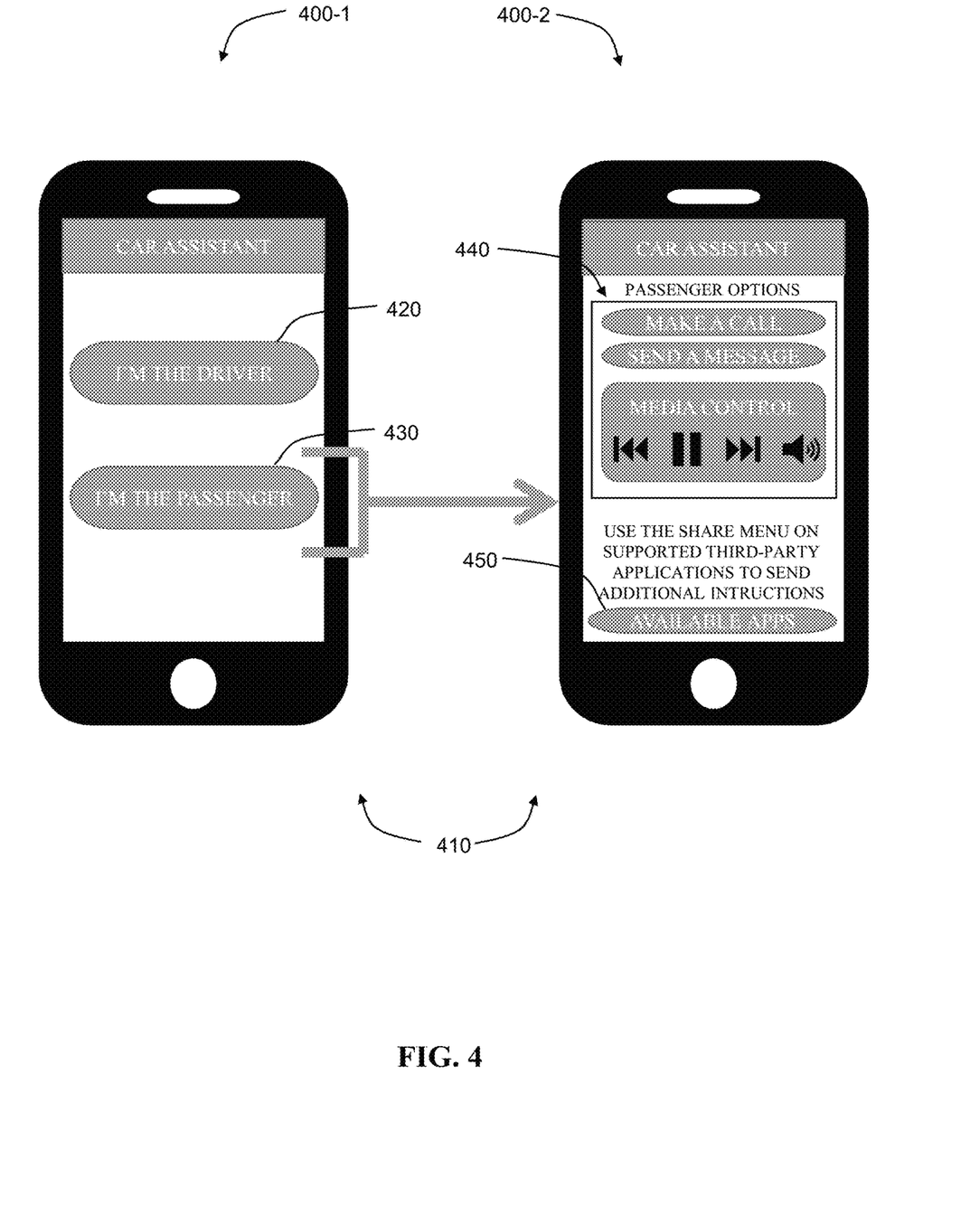
FIG. 4 depicts an example user interface for manual role selection and client device controls in accordance with embodiments of the present disclosure.

Referring now to FIG. 4, illustrated is an example user interface 400 for manual role selection and second client device controls in accordance with embodiments of the present disclosure. User interface 400 includes graphical user interface (GUI) 400-1 and GUI 400-2 which are each displayed by device 410. In some embodiments, a driver device (e.g., driver device 120 of FIG. 1) and a passenger device (e.g., second client device 130 of FIG. 1) can be communicatively coupled by a passenger operation network (e.g., passenger operation network 150 of FIG. 1) as part of a passenger operation network system (e.g., passenger operation network system 100 of FIG. 1). In some embodiments, during the utilization of the passenger operation network system a user of the driver device and/or a user of the passenger device can manually make a device role selection from GUI 400-1. The device role selection can comprise, but is not limited to, a driver role 420 (alternatively, driver role selection 420) and a passenger role 430 (alternatively, passenger role selection 430). In some embodiments, selecting the driver role 420 will indicate to the device that the device is the driver device and put the device in a driver operation mode (not depicted). The driver operation mode can comprise placing the device in a restricted operation mode which can restrict all, or a subset of, client operations on the driver device. The driver operation mode can comprise instructing the device to return to a lock screen or a navigation screen that is part of the factory operating system screens and settings of the client device. In some embodiments, a passenger role selection 430 selected via GUI 400-1 of the passenger device 410 can put the driver device in the driver operation mode.

In some embodiments, the passenger role selection 430 will place the device in the passenger operation mode depicted by GUI 400-2. In some embodiments, the passenger operation mode can comprise displaying a passenger user interface comprising passenger controls 440. Passenger controls 440 can comprise controls for sending at least one instruction to the driver device. The at least one instruction can relate to client operations of the driver device including, but not limited to, client operations relating to map data, traffic information, audio files, audio metadata, weather information, phone calls/phone call metadata, SMS message data, email data, contact information, and media commands. In some embodiments, a driver role selection 420 on the driver device can indicate a coupled device (e.g., the passenger device) is the passenger device and put the passenger device in a passenger operation mode.

In some embodiments, the passenger operation mode can be integrated with third-party applications. The passenger user interface can comprise a third-party application control 450. The third-party application control 450, when selected, can display information and/or commands related to installed third-party applications (e.g., games, social media applications, news applications, media/entertainment applications, productivity applications, podcast applications, etc.) with passenger operation mode capabilities. In some embodiments, the passenger operation mode can interface with third-party applications and provide controls on the passenger device for an application installed on the driver device without the need for installing the application on the passenger device.

In some embodiments, a conclusion of the driving of the vehicle can be detected by either the driver device (e.g., the driver's smartphone) or the passenger device (e.g., the passenger's smartphone). For example, the passenger device receiving a destination arrived signal from the driver device upon completion of a trip. In a second example, the passenger device receiving an indication from the driver device that the vehicle is no longer running or moving. Upon the detection of the conclusion of the driving of the vehicle the driver device and/or the client device can exit its/their respective operation modes and display GUI 400-1 awaiting role designation. Roles can then be redesignated. For example, a driver and passenger may be traveling together on a road trip and stop to refuel the vehicle. At the conclusion of the driving the driver and passenger devices may exit their respective modes and await redesignation. After refueling, if the driver and passenger switch roles to give the driver a break from driving, the operation modes of the respective devices can be redesignated and the display reversed without manually exiting the prior operation modes allowing for improved functionality and better usability of the devices.

Figure 5:
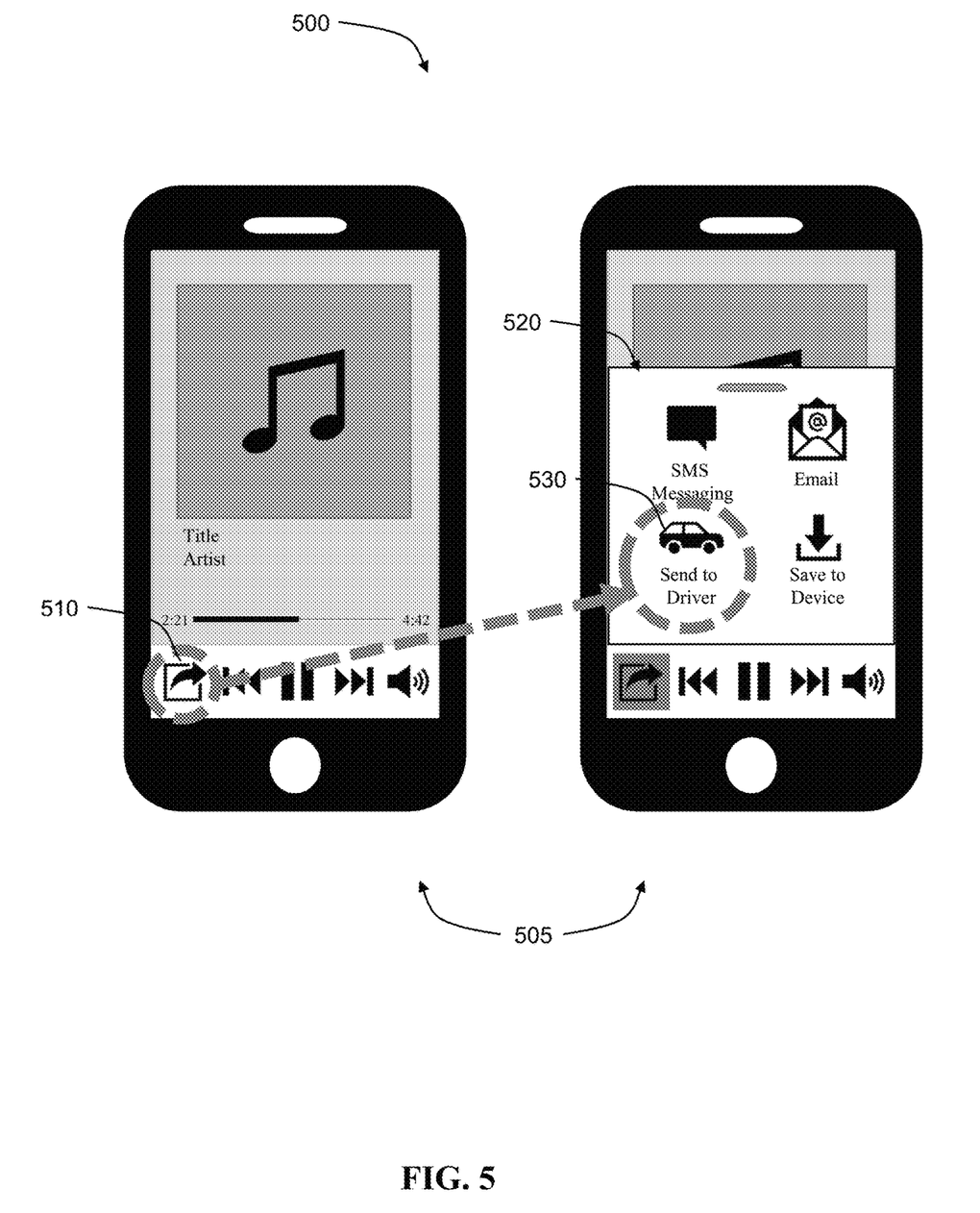
FIG. 5 depicts an example user interface for a share menu target representation of a client device in accordance with embodiments of the present disclosure.

Referring now to FIG. 5, illustrated is an example user interface 500 of a share menu target representation of a driver device (e.g., driver device 120 of FIG. 1) in accordance with embodiments of the present disclosure. In some embodiments, the driver device (not depicted) and a second client device 505 (e.g., a smartphone of a passenger in the vehicle of the driver) can be communicatively coupled by a passenger operation network (e.g., passenger operation network 150-1 of FIG. 1) as part of a passenger operation network system (e.g., passenger operation network system 100 of FIG. 1). The user interface 500 intuitively permits a third-party/passenger to supply a driver device (through the passenger operation network), and thus the driver, with updated information despite the driver device being restricted or without otherwise requiring the driver device to receive direct input from the driver. This technical solution helps the driver not be interrupted.

In some embodiments, an application of the second client device 505 can have a share menu icon 510. When the share menu icon 510 is selected, the second client device 505 can display a share menu 520. The share menu 520 can comprise at least one share menu target and can include a driver share menu target 530. By selecting the driver share menu target, a user of the second client device 505 can transmit at least one instruction to the driver device. The at least one instruction can relate to client operations of the driver device including, but not limited to, client operations relating to map data, traffic information, audio files, audio metadata, weather information, phone calls/phone call metadata, SMS message data, email data, contact information, and media commands.

The application of the second client device 505 can comprise a third-party application. For example, in an embodiment where the first client device is connected to the audio system of a vehicle, the user of the second client device 505 may be listening to an audiobook on a third-party application (e.g., audible) and want to play the audiobook on the vehicle's audio system. The user of the second client device 505, through the share icon within the third-party application, could stream the audiobook to the first client device. By the first client device, the audiobook could be played on the vehicle's audio system without the second client device 505 needing to download or install additional software, without requiring the user of the second client device 505 to exit the current third-party application, without disconnecting the first client device from the vehicle's audio system, and without the second client device 505 being connected to or having any knowledge of the vehicle or the vehicle's audio system.

Embodiments where the at least one instruction can be sent to the driver device via the driver share menu target 530 of the second client device 505 enable the user of the second client device 505 to get to the desired functionality without having to scroll around and switch views many times. It improves the efficiency of using the second client device 505 by allowing the at least one instruction to be sent directly from the share menu of third party applications without requiring the user of the second client device 505 to navigate to a separate application containing passenger controls (e.g., passenger controls 440 of FIG. 4). Thus, the functioning of the second client device 505, especially in embodiments where the second client device 505 comprises a small screen, is improved.

FIG. 6 depicts the representative major components of an example computer system 601 that may be used, in accordance with embodiments of the present disclosure. It is appreciated that individual components may vary in complexity, number, type, and\or configuration. The particular examples disclosed are for example purposes only and are not necessarily the only such variations. The computer system 601 may comprise a processor 610, memory 620, an input/output interface (herein I/O or I/O interface) 630, and a main bus 640. The main bus 640 may provide communication pathways for the other components of the computer system 601. In some embodiments, the main bus 640 may connect to other components such as a specialized digital signal processor (not depicted).

The processor 610 of the computer system 601 may be comprised of one or more cores 612A, 612B, 612C, 612D (collectively 612). The processor 610 may additionally include one or more memory buffers or caches (not depicted) that provide temporary storage of instructions and data for the cores 612. The cores 612 may perform instructions on input provided from the caches or from the memory 620 and output the result to caches or the memory. The cores 612 may be comprised of one or more circuits configured to perform one or methods consistent with embodiments of the present disclosure. In some embodiments, the computer system 601 may contain multiple processors 610. In some embodiments, the computer system 601 may be a single processor 610 with a singular core 612.

The memory 620 of the computer system 601 may include a memory controller 622. In some embodiments, the memory 620 may comprise a random-access semiconductor memory, storage device, or storage medium (either volatile or non-volatile) for storing data and programs. In some embodiments, the memory may be in the form of modules (e.g., dual in-line memory modules). The memory controller 622 may communicate with the processor 610, facilitating storage and retrieval of information in the memory 620. The memory controller 622 may communicate with the I/O interface 630, facilitating storage and retrieval of input or output in the memory 620.

The I/O interface 630 may comprise an I/O bus 650, a terminal interface 652, a storage interface 654, an I/O device interface 656, and a network interface 658. The I/O interface 630 may connect the main bus 640 to the I/O bus 650. The I/O interface 630 may direct instructions and data from the processor 610 and memory 620 to the various interfaces of the I/O bus 650. The I/O interface 630 may also direct instructions and data from the various interfaces of the I/O bus 650 to the processor 610 and memory 620. The various interfaces may include the terminal interface 652, the storage interface 654, the I/O device interface 656, and the network interface 658. In some embodiments, the various interfaces may include a subset of the aforementioned interfaces (e.g., an embedded computer system in an industrial application may not include the terminal interface 652 and the storage interface 654).

Logic modules throughout the computer system 601—including but not limited to the memory 620, the processor 610, and the I/O interface 630—may communicate failures and changes to one or more components to a hypervisor or operating system (not depicted). The hypervisor or the operating system may allocate the various resources available in the computer system 601 and track the location of data in memory 620 and of processes assigned to various cores 612. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
   detecting, by a first client device, driving of a vehicle, wherein the detecting is performed without receiving a signal from the vehicle;
   establishing, by the first client device, a passenger operation network connection with a second client device, the first client device configured to receive one or more instructions by the passenger operation network connection, wherein the first client device and the second client device are not the vehicle;
   receiving, by the first client device and based on the established passenger operation network connection with the second client device and based on the detected driving of the vehicle and without receiving any signal to restrict operation of any client device from the vehicle through the established passenger operation network, at least one instruction directed towards a first client operation of the first client device; and
   executing, in response to the received at least one instruction and based on the established passenger operation network connection, the first client operation by the first client device, wherein the first client device is operable in a restricted operation mode during the driving of the vehicle, and wherein while in the restricted operation mode the first client device restricts a subset of client operations of the first client device, wherein the first client device restricts input other than from the passenger operation network.

2. The method of claim 1, wherein the first client device is operable in a restricted operation mode during the driving of the vehicle, and wherein while in the restricted operation mode the first client device restricts a subset of client operations of the first client device.

3. The method of claim 2, wherein the first client operation is contained in the subset of restricted client operations.

4. The method of claim 1, wherein the establishing further comprises:
   obtaining sensor data of the first client device;
   receiving sensor data of the second client device;
   comparing the obtained sensor data of the first client device to the received sensor data of the second client device; and
   determining the first client device and the second client device are both in a passenger area of the vehicle indicating the second client device is a trusted device.

5. The method of claim 1, further comprising outputting the instruction to a third client device, the third client device in networked communication with the first client device.

6. The method of claim 5, wherein the third client device is selected from a group consisting of a head unit of a vehicle, a global positioning system (GPS) unit, a Bluetooth headset, a portable electronic device, and a wearable electronic device.

7. The method of claim 1, wherein the detecting of the driving of the vehicle includes detection by a sensor located outside of the first client device and in communication with the first client device.

8. The method of claim 1, wherein the detection of the driving of the vehicle includes the presence of a connection between the first client device and a third client device that indicates the driving of the vehicle.

9. The method of claim 1, wherein the instruction is selected from a group consisting of map data, traffic information, audio files, audio metadata, weather information, phone calls, SMS messages, emails, contact information, and media commands.

10. The method of claim 1, wherein the passenger operation network connection is selected from a group consisting of a personal area network (PAN), a cellular network, near field communication (NFC), radio frequency identification (RFID), infrared (IR), ultrasonic, a wireless local area network (WLAN), and a physical network.

11. The method of claim 1, wherein the method further comprises:
   detecting, by the first client device, a conclusion of the driving of the vehicle; and
   terminating the passenger operation network connection.

12. The method of claim 1, wherein the at least one instruction is received through an application installed on the first client device, and wherein the method further comprises:
   generating by the first client device and in response to the established passenger operation network connection, a user interface of the second client device, the generated user interface including a share target to the installed application.

13. The method of claim 1, further comprising receiving input indicating the second client device is a trusted device.

14. The method of claim 13, wherein a permission list indicates the second device is the trusted device.

15. The method of claim 1, wherein the method further comprises:
 determining, by the first client device and based on the detected driving of the vehicle, the first client operation is restricted; and
 ignoring, based on the at least one instruction, the restriction of the first client operation.

16. The method of claim 1, wherein the instruction from the second client device includes one or more data elements and wherein executing the first client operation includes performing the at least one instruction with the data elements.

17. A computer program product comprising a computer readable storage medium, wherein the computer readable storage medium includes instructions executable by a processor to cause the processor to perform a method comprising:
 detecting, by a first client device and based on a sensor internal to the first client device, driving of a vehicle, wherein a second client device is operable in a restricted operation mode during the driving of the vehicle, wherein while in the restricted operation mode the second client device restricts a subset of client operations of the second client device, wherein the driving of the vehicle is detected without any signal from the vehicle;
 establishing, by the first client device, a passenger operation network connection with the second client device, the passenger operation network connection configured to transmit at least one instruction from the first client device, wherein the first client device and the second client device are not the vehicle; and
 transmitting, by the first client device and based on the established passenger operation network connection with the second client device and based on the detected driving of the vehicle, the at least one instruction directed towards a first client operation of the second client device.

18. The computer program product of claim 17, wherein the computer program product further comprises:
 requesting, by the first client device and from the second client device, a list of operations able to be performed by the second client device; and
 determining, by the first client device, the second client device is operating in a restricted operation mode, and wherein the transmitting the at least one instruction further includes ignoring the restricted operation mode of the second client device.

19. A system for executing client operations during driving of a vehicle, the system comprising:
 a memory, the memory containing one or more program instructions;
 a processor, the processor communicatively coupled to the memory, and in response to reading the one or more program instructions configured to:
  detect, by a first client device and based on a vehicle sensor, driving of a vehicle, the first client device operable in a restricted operation mode during the driving of the vehicle, wherein while in the restricted operation mode the first client device restricts a subset of client operations of the first client device;
  establish, by the first client device, a passenger operation network connection with a second client device, wherein the first client device and the second client device are not the vehicle, the passenger operation network connection configured to receive at least one instruction from the second client device, the vehicle passenger operation network established directly between only the first client device and the second client device;
  receive, by the first client device and based on the established passenger operation network connection with the second client device and based on the detected driving of the vehicle, the at least one instruction directed towards a client operation of the first client device; and
  execute, in response to the received at least one instruction and based on the established passenger operation network connection, the first client operation by the first client device.

20. The system of claim 19, wherein the establish the passenger operation network is performed without communication with the vehicle.

* * * * *